United States Patent [19]

Greenewald, Jr.

[11] 4,028,123

[45] * June 7, 1977

[54] COMPACTED REFRACTORY SHAPES

[76] Inventor: Herbert Greenewald, Jr., 4296 Braunton Road, Columbus, Ohio 43220

[ * ] Notice: The portion of the term of this patent subsequent to Mar. 24, 1994, has been disclaimed.

[22] Filed: Aug. 5, 1975

[21] Appl. No.: 602,123

Related U.S. Application Data

[63] Continuation-in-part of Ser. Nos. 370,624, June 18, 1973, abandoned, and Ser. No. 172,550, Aug. 17, 1972, abandoned.

[52] U.S. Cl. .................................. 106/44; 106/57; 106/65; 106/66; 106/69
[51] Int. Cl.$^2$ ........................................ C04B 35/52
[58] Field of Search ............. 106/65, 40 R, 44, 57, 106/66, 69

[56] References Cited

UNITED STATES PATENTS

| | | | |
|---|---|---|---|
| 2,883,297 | 4/1959 | Jeitner | 106/65 |
| 3,082,104 | 3/1963 | Belz | 106/65 |
| 3,086,876 | 4/1963 | Griggs et al. | 106/65 |
| 3,151,994 | 10/1964 | Adlassnig | 106/65 |
| 3,219,466 | 11/1965 | Isherwood | 106/65 |
| 3,220,860 | 11/1965 | Robiette et al. | 106/65 |
| 3,220,862 | 11/1965 | Miller | 106/65 |
| 3,634,112 | 1/1972 | Yavorsky et al. | 106/65 |

*Primary Examiner*—J. Poer
*Attorney, Agent, or Firm*—Daniel H. Dunbar

[57] ABSTRACT

Compacted refractory shapes having sufficient densities for lining metal melting furnaces and use at service temperatures of 3,400° to 3,900° F to retain molten metal are formed in place by bonding refractory particles of alumina, for instance, with aluminum hydroxide generated by the reaction of aluminum with water in the presence of a corrosion accelerator, and either with or without a reaction control agent satisfactory for eliminating or significantly suppressing the evolution of hydrogen, nitrogen dioxide, hydrogen chloride, or the like from the reacting mass or for reducing the rate of reaction corrosion.

10 Claims, No Drawings

COMPACTED REFRACTORY SHAPES

CROSS-REFERENCES

This is a continuation-in-part of my previous application Ser. No. 370,624 filed June 18, 1973, and also of my previous abandoned application Ser. No. 172,550, filed Aug. 17, 1971, both now abandoned.

SUMMARY OF THE INVENTION

Finely divided refractory particles taken from the group consisting essentially of alumina particles, zircon particles, silica particles, chromium oxide particles and silicon carbide particles are combined with bond-forming ingredients consisting of aluminum metal powder and water which essentially form aluminum hydroxide bonds between the refractory particles by corrosion reaction at temperatures not exceeding approximately 200°–250° F. The weight of aluminum metal powder must be in the approximate range of from 5 to 10% by weight of refractory particles and the weight of the water in the approximate range of from 2 to 15% the weight of the refractory particles. The corrosion accelerator ingredient is from the group consisting of aluminum nitrate, aluminum chloride, nitric acid, hydrochloric acid, sulfuric acid, ammonium oxalate, oxalic acid, chromic acid, chromium nitrate, magnesium oxide, calcium oxide, hydroxylacetic acid, gluconic acid, and citric acid, and is included in an amount by weight of approximately from 2 to 10% the weight of the refractory particles and from 35 to as much as 200% the weight of the aluminum metal powder. If it is used, the reaction control agent may be from the group consisting essentially of glucose, aluminum chloride (excepting when the corrosion accelerator ingredient is aluminum chloride), chromic acid (excepting when the corrosion accelerator ingredient is chromic acid), ethyl alcohol, methyl alcohol, fructose, and dextrose generally in the weight amount of from 30 to 50% the weight of the aluminum metal powder. The ingredients for forming the refractory shapes are preferably in sequence thoroughly mixed, brought to a compaction temperature in the range of approximately from 65° to 200° F with the addition of reaction-initiating heat (if necessary), placed in a metal or other rigid form, compacted, and allowed to react with the consequent formation of aluminum hydroxide bonds between the refractory particles, such being the corrosion products of the combined aluminum metal powder and water ingredients of the composition. After the water vapors are driven from the integral shape at temperature by the corrosion reaction process, the shape is further heated by the external application of heat to a temperature of 400° to 500° F or greater to drive off substantially all except perhaps 0.1% of the contained water. The remaining water is afterwards completely removed on firing the shape to temperatures in the range of approximately 800° to 1,000° F.

DESCRIPTION OF THE DRAWINGS

No drawings.

DETAILED DESCRIPTION

The following examples 1 through 6 refractory shape composition formulations have been used in the practice of the instant invention. In each case the quantitative values are on a 100 parts total weight basis. Pertinent comments regarding preferred processing and resulting uses for the product follow the illustrative formulations.

Example 1

| Ingredients | Parts by Weight |
| --- | --- |
| Alumina, −10 + 30 mesh fused sand | 40.2 |
| Alumina, −60 mesh fused sand | 40.2 |
| Alumina, −325 mesh tabular flour | 10.0 |
| Aluminum, 120 mesh atomized metal powder | 5.0 |
| Active nitrate ion compound, aluminum nitrate crystal | 2.1 |
| Water | 2.5 |
| Total | 100.0 |

Example 2

| Ingredients | Parts by Weight |
| --- | --- |
| Alumina, −10 + 30 mesh fused sand | 36.9 |
| Alumina, −60 mesh fused sand | 36.9 |
| Alumina, −325 mesh tabular flour | 14.8 |
| Aluminum, 120 mesh atomized metal powder | 4.4 |
| Active nitrate ion compound, aluminum nitrate crystal | 3.5 |
| Water | 3.5 |
| Total | 100.0 |

Example 3

| Ingredients | Parts by Weight |
| --- | --- |
| Zirconium silicate sand | 61.8 |
| Zirconium silicate flour | 29.5 |
| Aluminum, 120 mesh atomized metal powder | 4.6 |
| Aluminum nitrate crystal | 1.9 |
| Water | 2.2 |
| Total | 100.0 |

Example 4

| Ingredients | Parts by Weight |
| --- | --- |
| Alumina, 6 F tabular sand | 43.4 |
| Alumina, 28 F tabular sand | 17.4 |
| Alumina, −325 mesh fused flour | 26.0 |
| Aluminum, 120 mesh atomized metal powder | 4.3 |
| Aluminum chloride | 2.1 |
| Chromic acid | 1.7 |
| Water | 5.1 |
| Total | 100.0 |

Example 5

| Ingredients | Parts by Weight |
| --- | --- |
| Alumina, 100 F fused sand | 41.7 |
| Alumina, −325 mesh fused flour | 33.3 |
| Magnesia, calcined | 8.3 |
| Aluminum, 120 mesh atomized metal powder | 4.2 |
| Water | 12.5 |
| Total | 100.0 |

Example 6

| Ingredients | Parts by Weight |
| --- | --- |
| Alumina, 6 F tabular sand | 40.0 |
| Alumina, 28 F tabular sand | 20.0 |
| Alumina, −325 mesh fused flour | 20.0 |
| Aluminum, 120 mesh atomized metal powder | 4.0 |
| Aluminum chloride | 1.4 |
| Aluminum nitrate crystal | 6.4 |
| Water | 8.2 |
| Total | 100.0 |

All of the above example formulations are within the limits heretofore specified as to proportional aluminum metal, water, corrosion accelerator, reaction control agent (if used) ingredient weights relative to weights of refractory particles. Basically, the refractory particles may be of any size from 4 mesh to flour and should be chemically inert to the aluminum metal, water, and selected corrosion accelerator and reaction control agent ingredients at temperatures near room temperature.

The refractory particles normally represent from 75 to 90% of the total unreacted shape composition. Alumina refractory has the highest service temperature in the practice of this invention and if selected may be used in the form of pure fused alumina, calcined alumina, tabular alumina, or alumina hydrate. Physical form and particle size determine the exact proportions preferred and the obtained final shape properties. Fused and tabular alumina provide greatest strengths, calcined the next greatest, and hydrated alumina the least. Hydrated alumina also produces the lowest obtained bulk densities.

The aluminum metal powder ingredient must be present in a minimum amount sufficient to raise the temperature of the pressed reacting mass to above 212° F to drive all contained free moisture from the shape during curing and prior to firing to removed combined water. The maximum amount of aluminum metal powder selected must be such that all aluminum included in the composition is reacted to form aluminum hydroxide particle bonds prior to firing at elevated temperatures to remove combined water.

Materials satisfactory for comprising the corrosion accelerators have the following necessary characteristics:

1. The accelerator must be substantially soluble in water at room temperatures and to 212° F;
2. The accelerator must be catalytic in the sense that it causes a rapid corrosion of the aluminum metal powder at temperatures up to 212° F and as such generally requires an aqueous solution pH of less than approximately 5 or greater than approximately 8;
3. The accelerator must not contain any metal ions other than aluminum, calcium, chromium, or magnesium;
4. The corrosion accelerator must not result in the formation of aluminum compounds that do not break down to aluminum hydroxide or aluminum oxide at temperatures of corrosion reaction or very low firing temperatures. Generally, accelerator ingredients having included phosphate or fluoride ions are unsatisfactory in the practice of this invention for this reason; and
5. The corrosion accelerator may be formed by the combination of two or more common chemicals to form a chemical whose precise identity is not presently known but whose resulting properties are clearly desirable. Examples of such combinations are:
  A. Aluminum nitrate and aluminum chloride—slows corrosion reaction and suppresses emission of hydrogen chloride and nitrogen dioxide;
  B. Aluminum nitrate and glucose—slows reaction in comparison to use of aluminum nitrate alone and suppresses emission of nitrogen dioxide;
  C. Aluminum nitrate and chromic acid—higher strength in formed shape and slows reaction in comparison to use of aluminum nitrate corrosion accelerator alone;
  D. Aluminum chloride and chromic acid—suppresses emission of hydrogen chloride;
  E. Nitric acid and glucose—minimizes formation of nitrogen dioxide and slows the corrosion reaction in comparison to use of nitric acid alone;
  F. Nitric acid and chromic acid—slows the reaction over nitric acid alone and produces higher end strength; and
  G. Sulfuric acid and chromic acid - results in higher end strength.

The basic steps required in the practice of this invention are:

1. Each of the accurately measured ingredients is combined in the following sequence in a vessel and utilizing continuous mixing:
  A. Water;
  B. Corrosion accelerator and, if used, reaction control agent; and
  C. Premixed refractory particles and aluminum metal powder.
2. Heat, if desired, may be applied to the mixing vessel next while continuing mxing and until a threshold compaction temperature just below the onset of initiation of accelerated corrosion is reached. Depending on the specific formulation used, and based largely on being slightly in advance of the mixture's time-temperature curve point of accelerated slope change, the threshold temperature will be somewhere in the range of 65° to 200° F and is the temperature at which no further heat is required to effect shape solidification and preliminary drying (curing) in situ.
3. The heated mixture at proper temperature is placed into a form for the refractory shape made of metal or other rigid material and is then pressed or compacted as by hand ramming. Heat may be applied to the mixture by properly heating the shape mold or form prior to placing the mixture therein.
4. The compacted composition is next allowed to react at ambient pressure and normally without the addition of further external heat until it attains a temperature above 212° F at which the contained free moisture is driven off. Material temperature to as high as approximately 250° F have been measured in connection with this curing step that forms aluminum hydroxide bonds as between the mixture's refractory particles.
5. The formed refractory shape is afterwards heated without damage by thermal shock or by elevated moisture pressures, by full furnace heat to drive off all residual combined water by the time the refractory shape attains a temperature of approximately 500° F. Further heating of the cured shape to temperatures of approximately 800° F maximum appears to be effective to drive off all residual combined water from the composition which generally appears to be very much less than 0.1% of the weight of the cured shape.

Several comments are in order with respect to certain of the Example 1 through 6 formulations.

The compositions of Examples 1 and 2 have been used to make metal melting crucibles that were subsequently exposed after thorough drying to molten metals at temperatures to as high as approximately 3,200° F without failure of the formed shape. The Example 3 composition has also been used for similarly forming a crucible for melting metal at temperatures to as high as approximately 3,000° F. It should be noted that nitrogen dioxide ($NO_2$) is apparently evolved from the composition during the exothermic (at or below the boiling point of the water solutions) reaction but because the aluminum, aluminum nitrate and water content is relatively small, the evolution of the nitrogen dioxide gas was not particularly noticeable. No hydrogen is evolved from the composition during processing. No measurable firing shrinkage was observed in these crucibles during firing or in service.

Example 4 was rammed into an inner lining for a melting furnace. The objective of this composition was to obtain a dense, hard, thermal shock resistant inner lining for a metal melting furnace. This composition was mixed by first mixing the dry alumina and aluminum metal powder, dissolving the aluminum chloride and chromic acid into a common solution, and then adding the liquid to the mixed ceramic dry material. This mix rammed well and did not bloat or swell during curing. It cured to a hard condition completely enclosed in forms where it was rammed in about 24 hours. The inner form, which was cardboard, was then burned out leaving the free standing refractory. No fume or gas was noted coming from the material while it was curing although the lining weighed about 3,000 pounds in total. It is notable that if aluminum chloride is used in the absence of either aluminum nitrate or chromic acid. dense fumes of hydrogen chloride of a moxt noxious nature are emitted during the foaming reaction or during the curing reaction.

Example 6 was mixed by first mixing the dry ceramic ingredients and then adding a premixed solution of the aluminum chloride. This composition forms a heavy casting mix which can be placed in the forms by casting but which does not substantially bloat or foam. It was used satisfactorily as the hard inner lining of a metal melting furnace. No noxious fume or hydrogen evolution was noted during the reaction or subsequently during initial firing of the furnace. The as cured lining was directly fired in about 1 hour's time to 3,000° F by the full application of power to the furnace. There was no damage to the refractory lining as a result of this exposure to extreme thermal shock and rapid removal of combined water.

The Example 5 composition was rammed by hand in a warm form after being mixed in accordance with the general procedure of Example 4. It cured in about 1 hour at 100° F without bloating or evidence of evolution of gas. This mix was designed for field use. The composition specified permits the premixing of the dry ingredients including the corrosion accelerator (magnesia) and the only mixing which must be done in the field is the addition of water.

I claim:

1. A process of manufacturing a rigid refractory shape comprising the steps of: (a) mixing refractory particles selected from the group consisting essentially of alumina particles, zircon particles, silica particles, chromium oxide particles, and silicon carbide particles with bond-forming ingredients consisting of aluminum metal powder, water, and a corrosion accelerator in solution with said water to form a uniform mixture; (b) compacting said mixture in a form at least in part defining said refractory shape; and (c) reacting said bond-forming ingredients to form aluminum hydroxide bonds between said refractory particles and thereby form said rigid refractory shape, said aluminum metal powder weighing substantially from 5 to 10% the weight of said refractory particles, said water weighing substantially from 2 to 15% the weight of said refractory particles, and said corrosion accelerator being from the group consisting essentially of aluminum nitrate, aluminum chloride, nitric acid, hydrochloric acid, sulfuric acid, ammonium oxalate, oxalic acid, chromic acid, chromium nitrate, magnesium oxide, calcium oxide, hydroxylacetic acid, gluconic acid, and citric acid and weighing substantially from 2 to 10% the weight of said refractory particles and substantially from 35 to as much as 200% the weight of said aluminum metal powder.

2. The process of claim 1 wherein said refractory particles and bond-forming ingredients are further mixed with a reaction control agent that chemically reacts with a gaseous reaction product of said aluminum metal powder, water, and corrosion accelerator when said refractory particles are bonded to form said rigid refractory shape.

3. The process defined by claim 2 wherein said reaction control agent is from the group consisting essentially of glucose, aluminum chloride excepting when said corrosion accelerator is aluminum chloride, chromic acid excepting when said corrosion accelerator is chromic acid, ethyl alcohol, methyl alcohol, fructose, and dextrose, and wherein said reaction control agent weighs substantially from 30 to 50% the weight of said aluminum metal powder.

4. The chemical reaction product formed at temperatures less than approximately 250° F from a compacted mixture consisting essentially of refractory particles in size between flour and 4 mesh and from the group consisting of alumina particles, zircon particles, silica particles, chromium oxide particles, and silicon carbide particles, aluminum metal powder weighing substantially from 5 to 10% the weight of said refractory particles, water weighing substantially from 2 to 15% the weight of said refractory particles, and corrosion accelerator selected from the group consisting essentially of aluminum nitrate, aluminum chloride, nitric acid, hydrochloric acid, sulfuric acid, ammonium oxalate, oxalic acid, chromic acid, chromium nitrate, magnesium oxide, calcium oxide, hydroxylacetic acid, gluconic acid, and citric acid and weighing substantially from 2 to 10% the weight of said refractory particles and substantially from 35% to as much as 200% the weight of said aluminum metal powder.

5. The product defined by claim 4 wherein said refractory particles, aluminum metal powder, water, and corrosion accelerator compacted mixture further consists of a reaction control agent that chemically combines with a gaseous chemical reaction product of said aluminum metal powder, water, and corrosion accelerator when said refractory particles are bonded to form said rigid refractory shape.

6. The product defined in claim 5 wherein said reaction control agent is from the group consisting essentially of glucose, aluminum chloride excepting when said corrosion accelerator is aluminum chloride, chromic acid excepting when said corrosion accelerator is chromic acid, ethyl alcohol, methyl alcohol, fructose, and dextrose and wherein said reaction control agent weighs substantially from 30 to 50% the weight of said aluminum metal powder.

7. The process defined by claim 1 wherein said mixture is heated by the external application of heat to a temperature in the approximate range of 60° to 200° F prior to forming said aluminum hydroxide bonds.

8. The product defined by claim 4 wherein said corrosion accelerator and water ingredients have a pH less than approximately 5 or greater than approximately 8.

9. The process defined by claim 1 wherein said corrosion accelerator and water ingredients have a pH less than approximately 5 or greater than approximately 8.

10. The process defined by claim 7 wherein said mixture is heated by the external application of heat prior to compacting said mixture.

* * * * *